Nov. 16, 1937. J. A. FRIED 2,099,560
GOVERNOR FOR ELECTRIC MOTORS
Filed July 16, 1934 4 Sheets-Sheet 2

INVENTOR.
Jerome A. Fried
by Parker, Brochnow & Varner
ATTORNEYS.

Nov. 16, 1937.     J. A. FRIED     2,099,560
GOVERNOR FOR ELECTRIC MOTORS
Filed July 16, 1934     4 Sheets-Sheet 4

Patented Nov. 16, 1937

2,099,560

UNITED STATES PATENT OFFICE 2,099,560

GOVERNOR FOR ELECTRIC MOTORS

Jerome A. Fried, Ithaca, N. Y., assignor to Allen Wales Adding Machine Corporation, Ithaca, N. Y.

Application July 16, 1934, Serial No. 735,324

14 Claims. (Cl. 200—52)

This invention relates to governors for electric motors which will tend to keep the speed of said motors at a desired predetermined speed even though the voltage of the current supplied to the motor or the load may fluctuate. Such motors and governors are particularly useful for the operation of adding and calculating machines. Most governors function at high speeds and are not adapted to being attached directly to an adding machine; also they are not capable of being made to function at the particular part of a cycle at which control is desired.

An object of the invention is to provide an improved, simple, dependable and efficient governor for controlling the speeds of electric motors.

Another object of the invention is to provide improved means for keeping the speed of the motor below a selected maximum, which may be employed with either high or low speed motors; with which the motor speed at which the governor becomes effective may be varied to some extent, and which is relatively simple, compact and inexpensive.

A further object of the invention is to provide an improved governor for electric motors which may be utilized to start and stop the motors as well as control its speed; which will start the motor automatically after the driven mechanism has been operated through a predetermined cycle; and which will be relatively simple and inexpensive.

Other objects and advantages will be apparent from the following description of an embodiment of the invention, and the novel features will be particularly pointed out hereinafter in the appended claims.

In the embodiment of the invention illustrated in Figs. 1 to 13, the improved governor has been applied to the electric drive of an adding machine where the motor is given successive, usually intermittent operations of a definite cycle in order to drive the running in or operating mechanism, such as is operated by the hand crank in the manual type of adding machine. While the governor broadly is of general application and may be used for controlling motors in various other types of machines, it is particularly valuable when applied to calculating devices such as shown.

Figure 1:
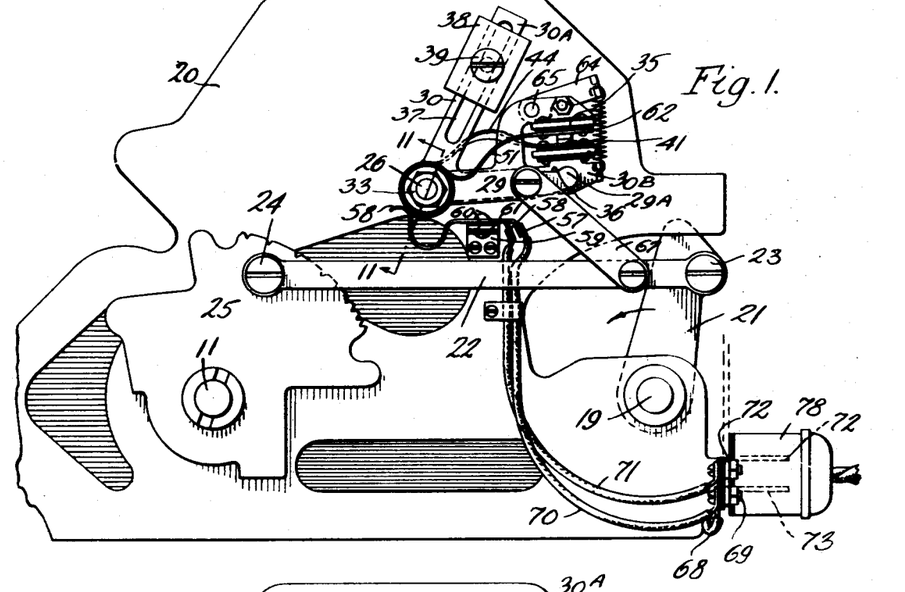
Fig. 1 is a side elevation of a portion of a frame of an adding machine of the electrically operated type to which the governor has been applied, with parts not directly related to the governor and its operation omitted in the interest of clarity, and with the parts in normal inactive positions.
Figure 2:
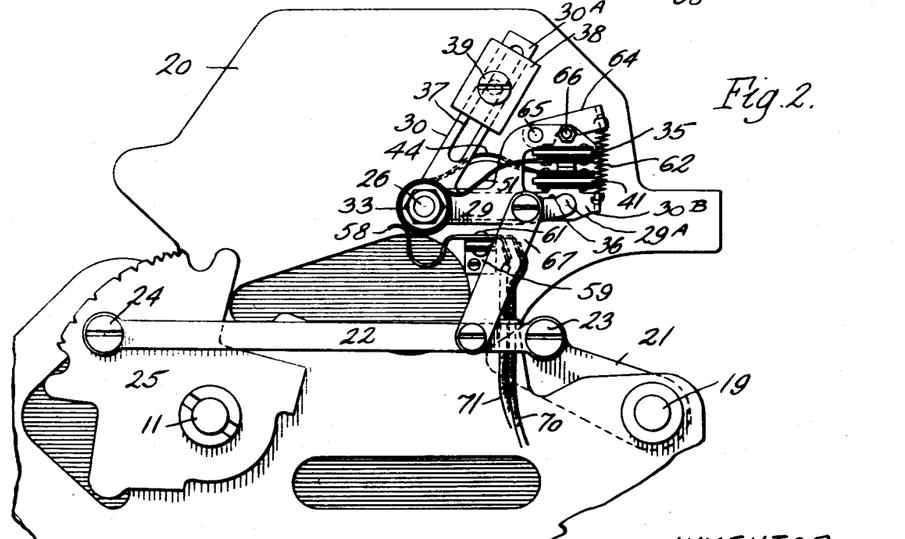
Fig. 2 is a similar elevation but with the governor in a different operative position.
Figure 3:
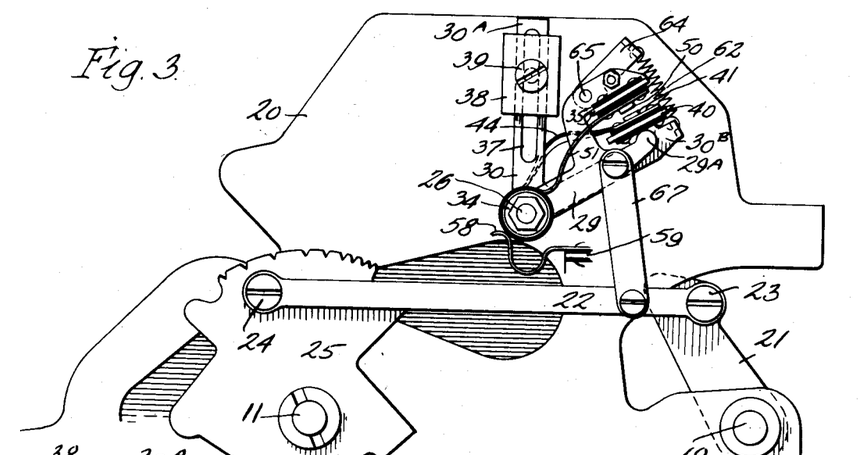
Fig. 3 is a similar elevation of the same with the governor in an intermediate position under conditions in which it is effective to check the speed of the motor.
Figure 9:
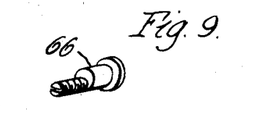
Fig. 9 is a perspective of the eccentric pin, by the rotation of which the minimum speed at which the governor becomes effective, may be changed.
Figure 10:
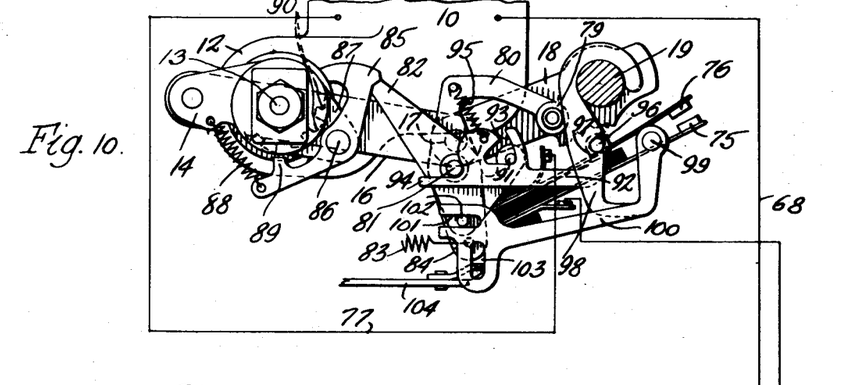
Fig. 10 is a side elevation of a portion of the motor, and the cycle controlling mechanism for the motor, together with a wiring diagram to illustrate the electrical details by which the operation of the motor is controlled.

In the illustrated application of the governor to a calculating machine, in Figs. 1 to 13 the electric motor 10, Fig. 10, may be of any suitable size and type and is employed for operating the running in and printing mechanism that is usually operated by a hand crank, not shown, applied to the main shaft 11, Figs. 1, 2 and 3. This operating handle or hand crank applied to the shaft 11, is brought forward and then released, whereupon a spring that was tensioned during the forward stroke of the handle, returns the handle to normal position. The electric motor 10 functions to operate the shaft 11 in the same cycle of movement and for the same purpose.

The electric motor 10 is preferably of the high speed type and is geared through a reduction gear unit 12, Fig. 10 to a shaft 13 of a one-revolution clutch mechanism. This shaft 13 carries an arm 14 which is connected by a pin 15 to a link 16, which is also pivotally connected by a pin 17 to an arm 18 that is fixed on a rock shaft 19, suitably mounted for rocking in the frame 20 of the calculating machine. This shaft 19 extends across the calculating machine from side to side, and at the side of the machine opposite from the motor 10 it carries an arm 21, Figs. 1 to 13, fixed thereon. A link 22 is pivotally connected by pin 23 to the free end of arm 21, and also by a pin 24 to the full stroke sector 25, which is fixed on shaft 11 and by which the motion of the motor is communicated to the main shaft 11.

For each cycle of movement of the motor 10, as controlled by the one revolution clutch mechanism, the arm 14 on the shaft 13 makes a complete revolution, and is then stopped by the one revolution clutch mechanism. During this one revolution, the arm 14 acts through the link 16 to rock the arm 18 and through it the shaft 19, and the latter rocks the arm 21 and through it the link 22 oscillates the full stroke sector 25 and the shaft 11. During this movement, the shaft 19 and arm 21 are rocked only through a fractional part of a revolution, such as from the normal, retracted or inactive position shown in Fig. 1 to the extreme actuated position, shown in Fig. 2, the movement being in the direction of the arrow of Fig. 1.

Figure 6:
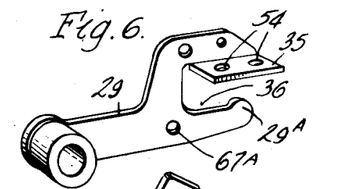
Fig. 6 is a perspective of the operating element forming a part of the governor.
Figure 7:
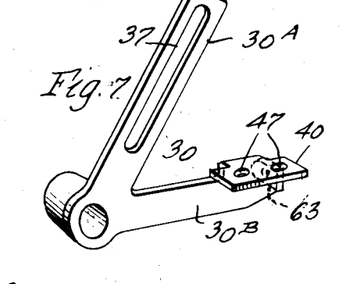
Fig. 7 is a perspective of the inertia element forming part of the governor.
Figure 8:
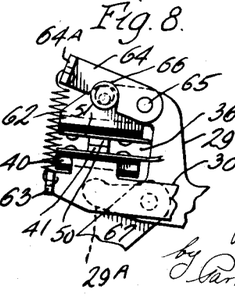
Fig. 8 is a side elevation of the inertia and operating elements shown in Figs. 6 and 7, but viewed from the opposite side from that shown in Fig. 1.
Figure 11:
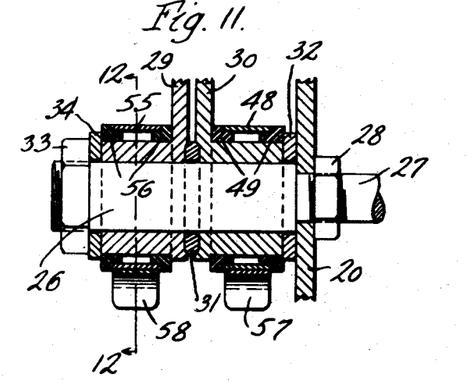
Fig. 11 is a sectional elevation of the mounting for the inertia and operating elements of the governor, the section being taken approximately along the line 11—11, Fig. 1.
Figure 12:
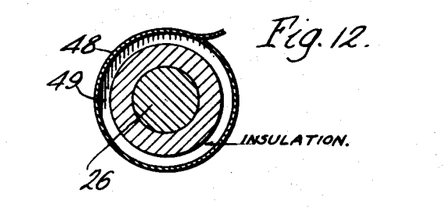
Fig. 12 is another sectional elevation through the mounting of the operating element, the section being taken approximately along the line 12—12, Fig. 11.

A stud 26, Figs. 1 to 3, and 11, is secured in any desired manner, such as by the threaded shank 27 and nut 28, Fig. 11, to one of the side frame plates of the machine frame 20, and upon this stud I pivotally mount an operating element 29, shown separately in Fig. 6, and an inertia element 30, shown separately in Fig. 7. These elements 29 and 30 are free and separately rockable on the stud 26, with the operating element 29 in front of the inertia element 30, and each of these elements may have a bearing boss or sleeve through which the stud 26 passes in order to provide a stable and non-binding bearing. These elements 29 and 30 may be spaced apart slightly by a spacer washer 31, the inertia element 30 may be spaced from the frame 20 by a washer 32, and a nut 33 and washer 34, provided on the outer end of the stud 26, serve to confine the elements 29 and 30 against removal from the stud 26.

Figure 4:
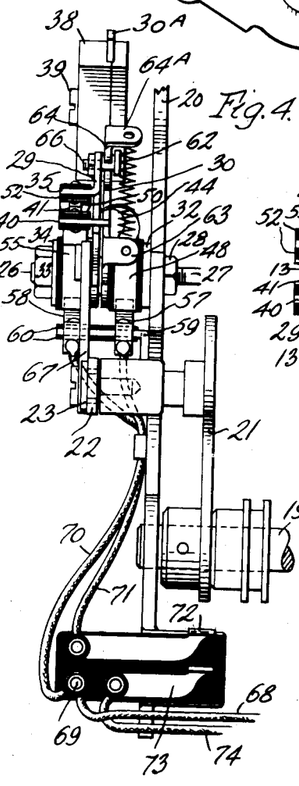
Fig. 4 is an end elevation of the same with the parts in the positions shown in Fig. 1.
Figure 5:
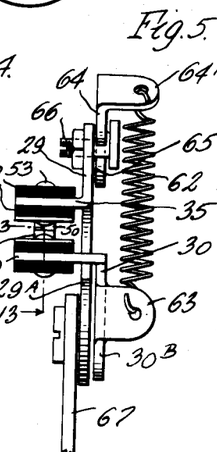
Fig. 5 is an end elevation similar to Fig. 4, but with some of the parts removed, and the remaining parts shown on a larger scale, in order to illustrate important parts of the improved governor.

The operating element 29 is provided with a laterally bent or struck out flange 35, Figs. 4 to 6, extending in a direction normal to the plane of the oscillatory movement of the element. Immediately adjoining the flange 35, the element 29 is provided with a notch or aperture 36 for a purpose which will appear presently. The inertia element 30 is conveniently in the nature of a bell crank arm or lever, and the arm 30A thereof is provided with an elongated slot 37 running endwise of the arm. A split weight 38 has its sections disposed against opposite faces of the arm 30A, and connected to one another and clamped to the arm 30A by a screw 39, which passes through the slot 37 and connects the two sections of the weight. The screw 39 serves to clamp the weight to the arm 30A in any of the different positions along that arm into which it may be moved after the screw has been loosened. The weight 38 has a groove extending therethrough at the slit which slidingly fits the arm 30A to be guided thereby.

The other arm 30B of the bell crank forming the inertia element 30, extends along the rear of the operating element 29 and is provided with a laterally bent flange 40 which extends forwardly through the notch 36 in the operating element 29, as shown clearly in Fig. 5, into a position immediately below, but facing, the flange 35 on the element 29.

Figure 13:
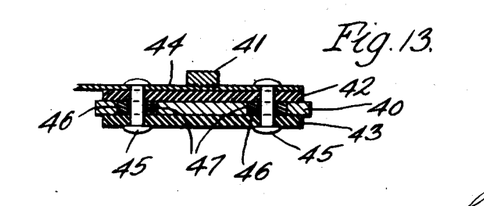
Fig. 13 is a sectional elevation through the contact mounting means of the inertia element, the section being taken approximately along the line 13—13, Fig. 5.

A contact 41 is provided on the flange 40, Figs. 5 and 13, and insulated therefrom. For this purpose, strips 42 and 43, Fig. 13, of insulating material are provided on opposite faces of the flange 40, and the contact 41 is riveted or welded to a metal conducting strip 44, which is secured flat against the upper face of the insulating strip 42, the strips 42, 43 and 44 being clamped or anchored to the flange 40 by rivets 45 which pass through all of these strips and through insulating bushings 46 that are set into apertures 47, Fig. 7, in the flange 40. The metal strip 44 extends rearwardly away from the flange 40, as shown in Fig. 4, and then towards the axis of oscillation of the inertia element 30, where it encircles the bearing boss of the inertia element to form a collecting ring 48, as shown in Fig. 11.

The ring 48 is insulated from the bearing boss of the element 30 by shouldered rings 49 of insulating material. Similarly, a contact 50 depending from a metal conducting strip 51, Fig. 5, is secured to the under face of the flange 35 and is insulated therefrom by insulating strips 52 disposed on opposite faces of flange 35, the strips 51 and 52 being attached to flange 35 by rivets 53 which are similar to the rivets 45, rivet bushings of insulating material and similar to bushings 46 being, of course, supplied in the openings 54 of the flange 35, before the strips 51 and 52 are applied to the flange 35.

The strip 51 to which the contact 50 is attached also extends toward the mounting stud 26 and there encircles the bearing boss of the operating element 29 to form a collecting ring 55, which is insulated from that bearing boss by shouldered rings 56 of insulating material and which are similar to the rings 49 which insulate the collecting ring 48. Spring brushes 57 and 58 bear upon the collecting rings 48 and 55 respectively, and are both mounted upon a bracket 59, Figs. 1 to 4, the brushes being insulated from the bracket by strips 60 of insulating material disposed on opposite sides of faces of the free arm of the bracket. Rivets 61 pass through the strips 60, the bracket, and the brushes 57 and 58, the rivets being insulated from the bracket by insulating bushings in the same manner as shown in Fig. 13 for the mounting of the strip 44.

With this arrangement a circuit through the switch contacts 41 and 50 from brushes 57 and 58 will be established in all the different angular or vibratory positions of the elements 29 and 30. The contacts 41 and 50 of the switch mechanism are held normally in contact with one another by a spring 62 which is connected at one end to a rearwardly extending lug 63 on the inertia element 30, and at its other end is attached to a rearwardly bent lug 64A of a lever 64, Figs. 1, 2, 3, 5 and 8, which is pivoted by pin 65 to the operating element 29. An eccentric pin or screw 66, Fig. 9, is carried by the operating element 29 to limit the movement of the lever 64 under the action of the spring 62. The screw or pin 66, when rotated, will cam the lever 64 in a direction to tension the spring 62, or will allow movement of lever 64 in the opposite direction to lessen the tension of spring 62, and thus will vary the resistance to separation of the contacts 41 and 50.

With the spring 62 acting between the elements 29 and 30 and urging them relatively in directions to maintain the contacts 41 and 50 together, the elements 29 and 30 will normally move together as a unit when element 29 is vibrated or oscillated. A link 67 (Figs. 1 to 3) is pivotally connected at one end to link 22, and at its other end to an aperture 67A in the operating element 29, by which the link 22 oscillates or vibrates the elements 29 and 30. During such oscillation or vibration of element 29, the inertia element 30 may lag behind the element 29 to some extent by inertia, as permitted by the notch or opening 36 in the operating element 29. The engagement of an abutment portion 29A of the operating element 29 with the flange 40 of the inertia element, limits the degree or extent to which the inertia element 30 can lag behind the operating element 29 when the operating element is moving in a counter-clockwise direction, Figs. 1 to 3. Thus, if the element 29 is moved in a counter-clockwise direction too rapidly, the element 30 will, by inertia, lag behind and increase the tension of the spring 62, and momentarily separate the contacts 41 and 50, as shown in Fig. 3.

By changing the tension of the spring 62, through rotation of the eccentric pin 66, the resistance to separation of the contacts may be increased so that the speed of the element 29 must be greater before the element 30 will lag behind and cause a separation of the contacts 41 and 50. By lessening the tension of spring 62, by rotation of the pin 66, the speed of the element 29 above which the element 30 lags and separates the contacts 41 and 50 will be decreased. Similarly, by adjusting the weight 38 to different extents away from the stud 26, the effect of its inertia may be varied, and the tendency of the element 30 to lag may be varied.

The circuit for the motor will next be described, with particular reference to Fig. 10. One terminal of the motor is connected by wire 68 to a terminal post 69, and the latter is connected by wire 70 to the brush 57 which bears on the collecting ring 48. From the collecting ring 48 the current may pass through the strip 44 to the contact 41. From the other and cooperating contact 50, the current passes through the conducting strip 51 to the collecting ring 55, thence through the brush 58 and a wire 71 to a contact post 72. A second and adjacent contact post 73 is connected by wire 74 to a contact 75 of a main controlling switch, the other contact 76 of the same controlling switch being connected by wire 77 to the other terminal of the motor. The contact posts 72 and 73 have free portions extending in slightly spaced, parallel relation to one another, so as to enter the openings of a well known type of detachable outlet plug 78, Fig. 1, to make contact therethrough to the power line.

The contact 76 (Fig. 10) of the main operating switch for the motor is normally urged away from the contact 75 to interrupt the circuit of the motor, and when operation of the motor is desired the contact 76 is engaged and flexed into closed circuit engagement with contact 75, by a roller 79, Fig. 10, which is pivotally carried on the end of a bell crank or switch lever 80, which is fixed on a stud 81 that is rockably mounted in the frame. A stop finger 82 is also fixed on the stud 81, so that the finger 82 and the bell crank or switch lever 80 move as a unit about the axis of the stud 81. A spring 83 is connected to a depending tail portion 84 of the stop finger 82, so as to urge the stop finger in a clockwise direction, Fig. 10, and carry its free end out of obstructing position with respect to a clutch dog 85, which is pivoted at 86 on a tail portion 87 of the arm 14.

A spring 88 is connected between the arm 14 and a tail of the clutch dog 85, for yieldingly urging the clutch dog in a direction to carry a clutch tooth or projection 89 thereof between adjacent teeth 90 of a ratchet wheel which is fixed on the shaft 13. When the clutch dog 85, in its rotation with the arm 14 about the shaft 13, engages against stop finger 82, the dog 85 will be rocked by finger 82 in a counter-clockwise direction (Fig. 10) to carry the clutch tooth 89 from the space between adjacent teeth 90, thus breaking the driving connection between the shaft 13 and the arm 14.

The bell crank or switch lever 80 carries a pin 91, and a trigger 92 is provided along one edge thereof with a slot or notch 93 which receives the pin 91. The trigger 92 also has a tail 94 which abuts against, rocks upon and slides along the shaft 81. A spring 95 is connected at one end to the elbow portion of the switch lever 80 and at its other end to the trigger 92 at a point between the notch 93 and tail 94. This spring 95, which is normally under tension, urges the trigger 92 upwardly to abut the lower end of the notch 93 against the pin 91 and the tail 94 against the shaft 81. The outer or free end of the trigger 92 is provided with a latch pin 96, which is normally engaged in a notch 97, provided in the side edge of a depending latch lever 98 that is pivotally mounted on the rock shaft 19.

The free end of the latch lever 98 is pivotally connected by a pin 99 to a latch lever link 100 which has a slotted end 101 slidably supported on a pin 102 carried by the switch lever 80. The link 100 also has a slot 103 extending vertically and at right angles to the slot 101, and a tripping device 104 is engaged with the slot 103 for operating the link 100. The tripping device 104 extends to a suitable point on the key board (not shown) of the calculating machine, so that when an operation of the motor is desired, the tripping device 104 is operated to pull the link 100 to the left in Fig. 10.

This movement of link 100, which is permitted by the sliding engagement between the notch 101 and the pin 102, swings the latch lever 98 to the left and releases the pin 96, whereupon the spring 83 rocks the stop finger 82 and the switch lever 80 in a clock-wise direction, the trigger 92 moving as a unit with the switch lever 80. This carries the roller 79 against the spring contact 76 and flexes the latter into switch closing engagement with the contact 75. When the stop finger 82 was moved in this manner, the clutch dog 85 was released and the spring 88 thereupon shifted the clutch dog tooth 89 into engagement with the teeth 90, which coupled the arm 14 to the shaft 13. The closing of the switch between the contacts 75 and 76 completes the circuit to the motor, and the motor begins to operate and through the gear reduction will rotate the arm 14 through one complete revolution. During that revolution, the arm 14 acts through the link 16 and arm 18 to rock the shaft 19 and cause a complete oscillation of the full stroke sector 25.

Concomitantly with this revolution, by mechanism which is not shown, but which forms the subject matter of another application, the pin 96 is elevated and relatched to the latch lever 98, just before the completion of a complete revolution of the arm 14. When the pin 96 is elevated and relatched in this manner, the trigger 92 is swung upwardly, and this trigger, through its action on the pin 91 and its fulcrum on the stud 81, rocks the switch lever 80 in a direction to elevate the roller 79 and release the contact 76. This contact 76 then separates from the contact 75 and opens the circuit of the motor, but the stored energy of the motor and the parts driven thereby will drive it somewhat further to complete the rotation.

When the roller 79 was elevated in this manner by the movement of the switch lever 80, the stop finger 82, which moves as a unit with the switch lever 80, was rocked back into the path of the clutch dog 85, so that as the arm 14 completes its rotation, the clutch dog will be disengaged from the shaft 13, which disconnects the arm 14 from the shaft 13 and leaves the arm 14 in the same starting position, even though the motor might continue to move slightly further due to inertia.

When the shaft 19 is rocked by the operation of the motor it imparts two complete vibrations to the operating element 29, and if the motor is operating at a speed above the desired speed for which the machine was set, the lag of the inertia element 30 opens the circuit of the motor momentarily at the contacts 41 and 50, as shown in Fig. 3, usually but once during the forward stroke of the full stroke sector 25, and usually but once during the return movement of the full stroke sector 25, provided the speed of the motor has not decreased sufficiently owing to the separation of contacts 41 and 50 during the forward stroke of sector 25. Thus the motor circuit will be opened one or more times during each cycle of operation of the driving mechanism, and the duration of each opening of the circuit, by the lag of the inertia element, will depend upon the inertia force which retards the movement of the element 30 with the operating element 29, it being understood that the spring 62 causes re-engagement of the contacts 41 and 50 as soon as the lagging force decreases sufficiently. If the motor attempts to operate the machine excessively fast, the motion of the governor is so violent that a flutter of the switch mechanism is set up which produces more than the normal single opening for each cycle of the governor.

The link 67 (Figs. 1 to 3) and the link 22 form a toggle or dead center connection between the arm 21 and the operating element 29, and this toggle connection passes through dead center at each operation. The normal position of the link 67 is shown in Fig. 1, and when the motor operates, the arm 21 and link 22 are moved to the left, Figs. 1 to 3. As the pivotal connection between the links 67 and 22 moves to the left, the connection between the links 67 and the element 29 will be pushed upwardly to elevate element 29. Such an intermediate position of link 67 is shown in Fig. 3, but as the movement of link 22 continues into the extreme position shown in Fig. 2, the pivotal connection between the links 67 and 22 will then tend to pull the link 67 downwardly. This may pull the operating element 29 slightly further in the downward direction than the position shown in Fig. 1, because the link 22 has moved downwardly to some extent while moving to the left in the drawings. Thus, during each forward rocking movement of the arm 21, the operating element 29 is rocked counter-clockwise and then returned approximately to normal position.

When the arm 21 and link 22 move to the right during the return movement of the full stroke sector 25, the link 67 will be elevated endwise into the intermediate position shown in Fig. 3, and then returned to the normal position shown in Fig. 1, during which the operating element 29 will again be given a complete oscillation. With this arrangement the operating element 29 and the inertia element 30 will be given two complete oscillations for each single complete oscillation of the arm 21, or for each cycle of operation of the motor. Two such complete oscillations of the operating element 29 and inertia element 30 for each cycles of operation of the motor of an adding machine have been found sufficient to effect adequate control of the motor speed, but it will be understood that the link 67 may be connected to any moving part of the mechanism.

The speed of that moving part of the mechanism may be stepped up or geared up to cause more vibrations of the elements 29 and 30 forming the inertia switch, per cycle of operation for the motor, if the two complete oscillations of the inertia switch are not sufficient to control the motor speed adequately. When the invention is utilized for controlling the speed of motors driving other mechanisms, it is merely necessary to provide suitable mechanism such as a crank for vibrating the operating element 29 any desired number of times for a given extent of movement of the motor. The action of the link 67 is very much like the action of the connecting rod or link of a crank mechanism and, of course, may be connected by crank mechanism to any mechanism driven by the motor.

The operation of this improved governor should be clear from the foregoing description, but will be briefly summarized. The motor is set in operation by the tripping device 104 which releases the trigger 92, whereupon roller 79 forces the contact 76 into engagement with contact 75 and starts the motor in operation. At the same time the stop finger 72 releases the clutch dog 85, and the shaft 13 driven by the motor is then coupled to the arm 14. The arm 14 is then given a complete rotation and in doing so it rocks the shaft 19 and the arm 21 from the position shown in Fig. 1 to the position shown in Fig. 2, during which movement the elements 29 and 30 are given a complete oscillation. All of this occurs during one part of a revolution of the arm 14, and during the remaining part revolution the shaft 19 and arm 21 are returned from the Fig. 2 to the Fig. 1 position, during which the elements 29 and 30 of the governor mechanism will be given another complete oscillation or vibration.

Just prior to the completion of the rotation of arm 14, the trigger pin 96 is relatched, and the circuit of the motor opened at contacts 75 and 76, the stop finger 82 being concomitantly returned to a position in which it obstructs travel of the clutch dog 85 which is moving clockwise with arm 14 in Fig. 10, and when this obstruction occurs, the arm 14 is uncoupled from the shaft 13 and the parts remain in the positions shown in Figs. 1 to 3, and 10, even though the motor may continue to operate slightly further by inertia. If the speed of the motor is too great during the above described operation, the inertia element 30 will lag behind the element 29 and momentarily open the circuit of the motor at contacts 41 and 50, as shown in Fig. 3, and this opening of the circuit of the motor temporarily slows down the motor speed.

The separation of contacts 41 and 50 is only momentary because the spring 62 soon brings the contacts 41 and 50 again into engagement with one another, and during the vibration of elements 29 and 30 in the opposite direction, there can be no separation of the contacts 41 and 50 due to any lag of the element 30, because the drive between the elements 29 and 30 in that direction is unyielding. This interruption of the current of the motor at contacts 41 and 50 will also occur during the second vibration of the elements 29 and 30 for each cycle of operation of the operating mechanism if the momentary interruption of the current during the first vibration of that cycle does not decrease the speed of the motor sufficiently.

Figures 14, 15, 16, 17:
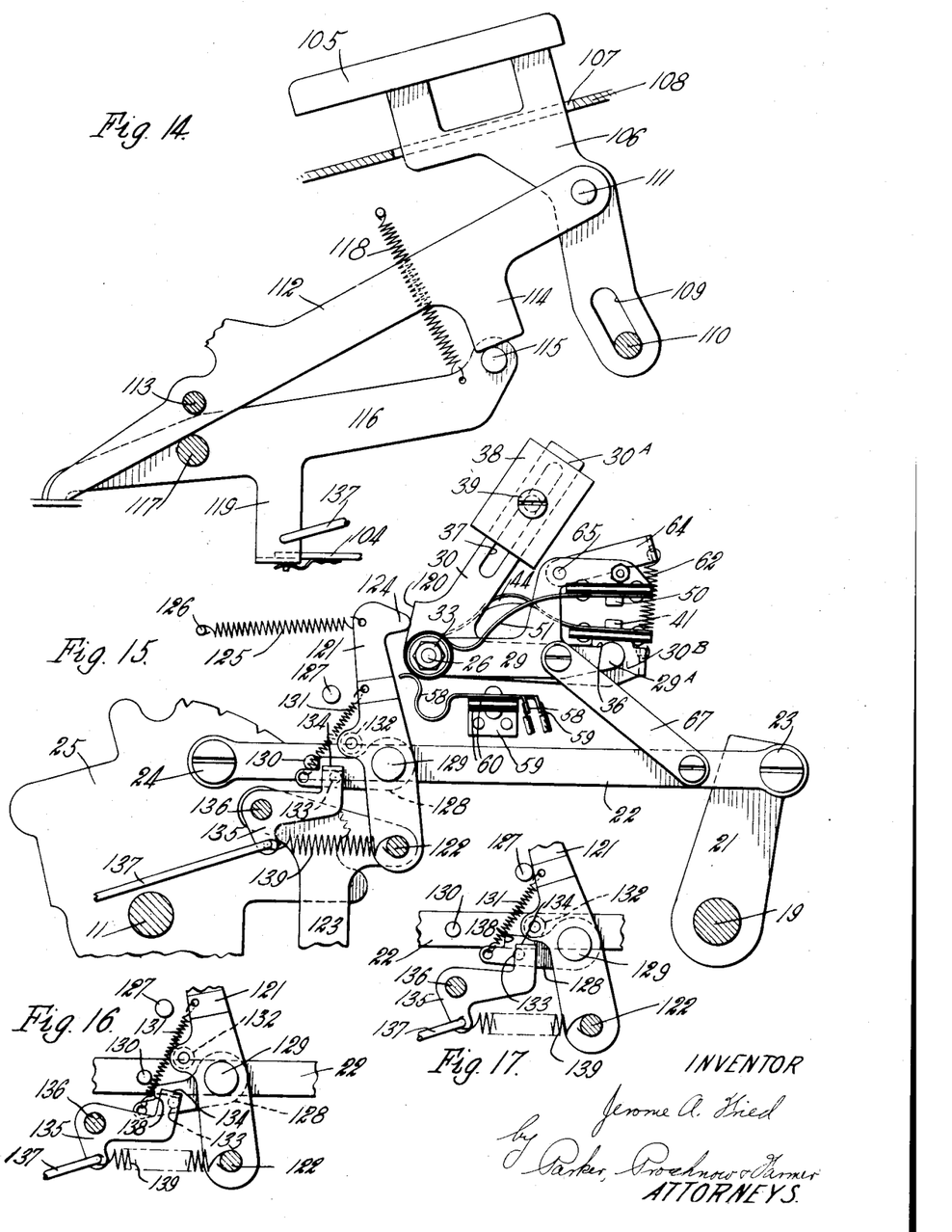
Fig. 14 is a sectional elevation through a part of a calculating machine and illustrating mechanism that may be employed to initiate an operation of the motor.
Fig. 15 is a sectional elevation, somewhat similar to Fig. 1, of a part of a calculating machine also constructed in accordance with the invention but illustrating another embodiment thereof, in which the governor also acts as the main switch, the mechanism shown in Figs. 14 and 15 being connected together in use.
Fig. 16 is a sectional elevation of a part of the mechanism shown in Fig. 15 with the parts shown in the positions taken at the moment of tripping in order to start an operation of the motor.
Fig. 17 is a similar elevation showing the position of the parts during the operation of the motor.

Referring next to Figs. 14 to 17, the mechanism shown in Fig. 15 is disposed at the right of the mechanism shown in Fig. 14, and connected thereto in a manner which will be explained presently, to illustrate a modification of the invention in which the governor is also utilized as a start and stop switch for the electric motor. In this modification of the invention, and referring first to Fig. 14, the calculating machine is provided with a touch bar 105 which is mounted on a stem 106 that reciprocates in an aperture 107 in a housing 108 for the calculating mechanism. The stem 106, at its lower or inner end, is provided with an elongated slot 109 which receives a stud 110 carried by the housing 108. The stem 106, at a point between the slot 109 and the touch bar 105, is connected by a pivot pin 111 to a lever 112 which, in turn, is pivoted at 113 to the housing 108.

The lever 112 and the stud 110 together form means for supporting the stem of the touch bar and guiding it in its reciprocations or movements to the extent permitted by the slot 109. The lever 112 is provided with a depending lug or arm 114 which engages against a stud 115 carried by a lever 116 that is pivoted by a stud 117 on the frame 20 of the calculating mechanism. A spring 118 is connected between the lever 116 and a suitable part of the frame 20 so as to urge the lever 116 upwardly and, through the stud 115 and lever 112, elevate the touch bar 105 to the position shown in Fig. 14. When the touch bar 105 is depressed, it will tension the spring 118 and rock the lever 116 in a manner to initiate the operation of the motor, which will now be described.

The trip rod 104 of Fig. 10, which controls the clutch, is connected to a depending lug or arm 119 (Fig. 4) of the lever 116, so that when the touch bar 105 (Fig. 14) is depressed, the trip rod 104 will be operated to release the stop finger 82 (Fig. 10) and thus permit an operation of the spring 88 to engage the clutch dog 85 and the clutch ratchet wheel teeth 90. In this modification, the switch mechanism 75—76 shown in Fig. 10 is omitted and the latch lever 98 utilized to control only the stop finger 82 of the clutch. In place of the switch parts 75, 76, the governor is utilized for the complete control of the motor, and for this purpose the governor is constructed and operated as explained in connection with Figs. 1 to 13, except that the inertia lever 30 is provided with an edge abutment 120, Fig. 15, by which the inertia lever 30 may be forcibly operated or controlled in order to start and stop the motor. The governor parts are designated by the same reference characters in Fig. 15 as are employed in Figs. 1 to 13.

A switch control lever 121 is pivoted at 122 to a suitable bracket 123 of the frame 20, and is provided with a nose 124 at its free end which is engageable against the abutment 120 on the inertia lever 30. A spring 125 is connected between the lever 121 and a suitable stud 126 on the frame 20 of the calculating mechanism, so as to urge the lever 121 in a direction away from the abutment 120, until stopped by a stud 127, also carried by the frame 20 of the calculating mechanism. A trigger 128 is pivoted by a pin 129 to the lever 121 at approximately the point where the lever 121 crosses the link 22 that connects the rear shaft arm 21 with the full stroke sector 25. The link 22, however, in this embodiment of the invention is provided with a trigger stud 130 which projects into the path of movement of the trigger 128.

A spring 131 is connected between the free end of the trigger 128 and a suitable part of the lever 121 so as to urge the trigger 128 edgewise against the stud 130, but when the stud 130 is moved out of the path of the trigger 128 by its travel with the link 22, the movement of the trigger 128, under the action of the spring 131, is limited by a suitable stud 132 that also is carried by the lever 121. The trigger 128 is also provided with a trip stud 133, and this stud 133 is disposed beneath a laterally extending flange 134 on a trip lever 135 which is pivoted on a stud 136 on the bracket 123.

The trip lever 135 is connected by a link 137 to the depending arm or lug 119 of the lever 116, so that when the touch bar 105 is depressed, the link 104 will not only release the clutch to cause a coupling of the motor to the calculating mechanism, but through the link 137, the trip lever 135 will be rocked in a clockwise direction, Figs. 15–17, into the position shown in Fig. 16, during which its flange 134 operates the trip stud 133 and through it the trigger 128 into the position shown in Fig. 16. This carries a shoulder 138 of the trigger out of engagement with the stud 130 on the link 22. The spring 125 then shifts the lever 121 away from and releases the inertia lever 30, whereupon the spring 62 (Fig. 1) shifts the lever 30 in a direction to close the contacts 41 and 50 and start an operation of the motor. A spring 139 (Figs. 15 to 17) is connected between the trip lever 135 and a suitable anchorage point, such as the pivot pin 122, on which the lever 121 is mounted, and this spring 139 urges the lever 135 in a direction to elevate the flange 134 and release the trigger 128.

When the switch contacts 41 and 50 are engaged, the motor begins to operate, and through the clutch, operates the link 22 in the manner explained in connection with Figs. 1 to 13, which would be to the left in Fig. 15. This would carry the pin 130 to the left and away from the trigger 128, as shown in Fig. 17, and the stud 132 on the lever 121 limits the movement of the trigger 128 under the action of its spring 131, the parts assuming the positions shown in Fig. 17. As the link 122 returns to its normal position, shown in Fig. 15, which would be at approximately the end of a predetermined cycle of operation, the trigger stud 130 thereon will engage against the shoulder 138 of the trigger 128 and push the trigger to the right in Figs. 15-17, which will force the lever 121 to the right, and through the nose 124 thereon will rock the inertia switch lever 30 in a direction to shift the contact 41 away from the contact 50 and open the circuit of the motor, thereby stopping the operation of the motor. The clutch is simultaneously opened by the stop finger in the manner explained in connection with Figs. 1 to 13.

In the operation of the modification of the invention shown in Figs. 14 to 17, a person desiring to initiate an operation of the mechanism, depresses the touch bar 105 and then releases it. When the bar 105 is depressed, it operates the lever 116 and through the link 104 causes an engagement of the clutch, and through the link 137 releases the trigger 128 from the stud 130 on the link 22. When the trigger 128 is released from the stud 130, the spring 125 operates the lever 121 into a position against the stud 127, which is the position shown in Fig. 17. When this occurs, the lever 30 of the governor is released, whereupon the spring 62 moves the lever 30 in a direction to engage the contact 41 with the contact 50, thus completing the circuit of the motor.

The motor thus operates and through the clutch drives the calculating mechanism and shifts the link 22 carrying the trigger stud 130 away from the trigger 128, as shown in Fig. 17. The link 22 is moved in an approximately endwise direction to the left in Fig. 15, and then is returned to the position shown in Fig. 15, which completes the desired cycle of operation for the motor and the mechanism driven thereby. When the touch bar 105 is released, the springs 118 and 139 return the touch bar to its elevated position and the trip lever 135 to the normal position shown in Figs. 15 and 17. When the flange 134 of lever 135 is elevated, the spring 131 elevates the trigger 128 until limited by the stud 130 of the link 22, by the stud 132 on the lever 121, or by engagement of the stud 133 with the flange 134.

When the stud 130 moves with the link 22, to the left in Fig. 15, the trigger 128 is limited in its upward movement only by the stud 132 or the flange 134, and hence the trigger 128 will be held in the position shown in Fig. 17, in which the shoulder 138 is in the path of travel of the stud 130 on the link 22. Just before the stud 130 completes its return movement to the position shown in Fig. 15, it will engage the shoulder 138 and push the trigger 128, and through it the lever 121, in a direction to separate the contacts 41 and 50 and open the circuit of the motor, which position of the parts is shown in Fig. 15.

It will be understood that the illustration and description of the invention as applied to adding machines is only for the purpose of disclosing and illustrating one embodiment of the invention in which it has particular value and usefulness, and that the invention may be applied to the operation of other machines as well, within the board principles of the invention.

It will also be understood that various changes in the details and arrangements of parts which have been herein described and illustrated in order to explain the nature of the invention may be made by those skilled in the art within the principle and scope of the invention as expressed in the appended claims.

I claim:

1. A governor for an electric motor with an electric operating circuit comprising, a mechanism adapted to be driven by said motor in a given cycle, an operating element, means connecting said mechanism to said element for oscillating said element about a fixed axis, a plurality of cycles for each cycle of operation of said mechanism, an inertia element mounted for oscillation solely about the same fixed axis and separately of said operating element in a path approximately parallel to that of said operating element, resilient means connecting said inertia element to said operating element and urging said inertia element about said axis into contact with said operating element for normal oscillation therewith about said fixed axis, but with said inertia element free to lag when its inertia is sufficient to overcome the tension of said resilient means, and switch means connected to said elements and operable automatically to open position upon a lagging of said inertia element upon said fixed axis, whereby when said switch means is connected in series with said motor in said circuit, a lagging of said inertia element on said axis will cause a decrease in the speed of said motor.

2. A governor for an electric motor with an electric operating circuit comprising, a mechanism adapted to be driven by said motor in a given cycle, a pivoted operating element, an inertia element pivoted for rotation solely about approximately the pivotal axis of said operating element, a motion multiplying connection between said operating element and said mechanism operable for vibrating said operating element on said axis, a plurality of cycles for each cycle of operation of said mechanism, switch members, each mounted on one element and facing the member on the other element, a spring connecting said elements and urging them about said axis in directions to bring the switch members into contact with one another and cause normal vibration of said inertia element with said operating element as a unit, and said inertia element being free to lag on said axis against the tension of said spring and separate said members when said operating element is moving in one direction, whereby when said circuit for said motor includes in series therein said switch members, the separation of said switch members by the lag of said inertia element will decrease the speed of said motor.

3. A governor for an electric motor with an electric operating circuit comprising, an operating element pivoted for oscillation, an inertia element also mounted for oscillation about approximately the axis of oscillation of said operating element, a contact carried by each of said elements and engageable with the contact carried by the other of said elements, a spring connecting said elements and operable to urge them in a direction to urge said contacts resiliently into engagement with one another, mechanism adapted to be operated by said motor and including a member moved to and fro at each operation of said mechanism, link means connecting said member to said operating element for vibrating it, a plurality of cycles for each cycle of movement of said member, whereby when said circuit for said motor includes said contacts in series therewith, the separation of said contacts will open the circuit of said motor, the lag of said inertia element in one direction when the speed of the motor exceeds a selected speed automatically causing a momentary separation of said contacts and a slowing down of said motor.

4. A governor for an electric motor with an electric operating circuit comprising, an operating element pivoted for oscillation, an inertia element also mounted for oscillation about approximately the axis of oscillation of said operating element, a contact carried by each of said elements and engageable with the contact carried by the other of said elements, a spring connecting said elements and operable to urge them in a direction to urge said contacts resiliently into engagement with one another, mechanism adapted to be operated by said motor and including a member moved to and fro at each operation of said mechanism, link means connecting said member to said operating element and passing through a dead-center position during movement in each direction of said member to impart to said operating element a multiple number of movements for each movement of said member, whereby when said circuit for said motor includes said contacts in series therewith, the separation of said contacts will open the circuit of said motor, the lag of said inertia element in one direction when the speed of the motor exceeds a selected speed automatically causing a momentary separation of said contacts and a slowing down of said motor, said operating element having an abutment portion normally spaced from, but engageable with the inertia element to limit the degree of lag of said inertia element.

5. In a governor for an electric motor with an electric operating circuit, the combination of, mechanism adapted to be driven by said motor in a desired cycle and including an arm rocked thereby, a second arm pivoted on an axis parallel to the first arm and spaced therefrom, a link connecting said arms so as to cause concomitant operation of said arms, an operating element and an inertia element mounted for pivotal movement about substantially the same axis but independently of one another, a link pivotally connecting said operating element and said first mentioned link and forming with said first link and said operating element a toggle connection moving substantially through dead center position at each movement of the first link, whereby for each cycle of movement of said arms said operating element will be given two complete vibrations, a pair of switch contacts, one carried by each of said elements and engageable with one another upon the relative movement of said elements in one direction, a spring connecting said elements and urging them in a relative direction to bring said contacts into engagement with one another and couple said elements yieldingly together for normal vibration as a unit, whereby when said circuit for said motor includes said contacts the separation of the contacts opens the circuit of the motor, and the speed of the motor exceeds a selected speed, the inertia element will lag behind the operating element, when said elements are being operated in one direction, and separate said contacts momentarily to check the speed of said motor.

6. A governor for an electric motor with an electric operating circuit comprising, an operating element and an inertia element mounted for pivotal movement about approximately the same axis separately from one another, said elements having lateral flanges facing one another and approximately normal to the plane of oscillation of said elements, a switch contact carried by each of said flanges on the side facing the other flange so that the contacts may engage when said elements are rocked in a direction to cause approach of said flanges, a spring connecting said elements and urging them in a relative direction to cause engagement of said contacts, and yieldingly and resiliently opposing separation of the contacts, mechanism adapted to be driven by said motor and connected to said operating element to vibrate the same whereby when said circuit for said motor is connected to said contacts in the different rocking movements of said elements, the separation of said contacts will cause a change in the speed of said motor, and whenever the speed of operation of said motor exceeds a selected speed, the lag of said inertia element will cause a separation of said contacts momentarily and a decrease in the speed of said motor.

7. A governor for an electric motor with an electric operating circuit comprising, an operating element and an inertia element mounted for pivotal movement about approximately the same axis separately from one another, said elements having lateral flanges facing one another and approximately normal to the plane of oscillation of said elements, a switch contact carried by each of said flanges on the side facing the other flange so that the contacts may engage when said elements are rocked in a direction to cause approach of said flanges, a spring connecting said elements and urging them in a relative direction to cause engagement of said contacts, and yieldingly and resiliently opposing separation of the contacts, mechanism adapted to be driven by said motor and connected to said operating element to vibrate the same, whereby if said contacts are connected in series with said motor in said circuit, then whenever the speed of operation of said motor exceeds a selected speed, the lag of said inertia element will cause a separation of said contacts momentarily and a decrease in the speed of said motor, said operating element having an abutment engageable with the inertia element and limiting the extent of lag of the inertia element to a desired extent.

8. A governor for an electric motor with an electric operating circuit comprising, an operating element and an inertia element mounted for pivotal movement about approximately the same axis separately from one another, said elements having lateral flanges facing one another and approximately normal to the plane of oscillation of said elements, a switch contact carried by each of said flanges on the side facing the other flange so that the contacts may engage when said elements are rocked in a direction to cause approach of said flanges, a spring connecting said elements and urging them in a relative direction to cause engagement of said contacts, and yieldingly and resiliently opposing separation of the contacts, mechanism adapted to be driven by said motor and connected to said operating element to vibrate the same, whereby if said contacts are connected in series with said motor in said circuit, then whenever the speed of operation of said motor exceeds a selected speed, the lag of said inertia element will cause a separation of said contacts momentarily and a decrease in the speed of said motor, one of said elements having an arm pivoted thereto and connected to said spring at a substantial distance from said pivot to form the connection between said spring and that element, said one of the elements also having an eccentric pin rotatable thereon and engageable with said arm to cam it in a direction to vary the tension of said spring and thereby modify the speed of the motor at which the inertia element lags sufficiently to cause a separation of the contacts.

9. A governor for an electric motor with an electric operating circuit comprising, mechanism adapted to be driven by said motor, switch means driven by said mechanism and having resiliently connected switch parts moved relatively to one another automatically by inertia lag of one of said parts behind the other when the speed of operation exceeds a selected speed, whereby when said switch parts are connected in series with said motor in said circuit, the speed of said motor will be controlled by said inertia lag, and means operable by said mechanism automatically at the end of a predetermined cycle of operation for forcibly causing relative movement of said switch parts in a direction to separate them.

10. A governor for an electric motor with a controlling circuit, comprising mechanism adapted to be driven by said motor, a leading switch part moved to and fro by said mechanism and having a slot therein, a trailing switch part also mounted to move to and fro in the same direction and having a portion disposed in the slot of said leading part, and having lost motion in said slot in the direction of movement of said parts and resilient means for causing said trailing switch part to follow the leading part in one direction and maintain said parts normally in contact, but yielding upon separation of said parts by inertia lag of said another part behind the first part whenever the speed of said first part exceeds a selected speed, said switch parts being adapted to control said circuit and through it said motor, whereby the separation of said parts will decrease the speed of the motor.

11. A speed governor for a machine having an electric circuit controlling its speed which comprises mechanism adapted to be driven from said machine and including a member movable to and fro in timed relation to said machine, an inertia switch having a leading switch part and a trailing switch part moving in parallel paths and connected by resilient means urging said parts into contact with one another when moving in one direction, but yielding upon separation of the parts by inertia lag of the trailing part behind the leading part whenever the speed of the leading part exceeds a selected speed, a contact on each of said parts in position to engage the contact of the other of said parts when said parts are caused to engage one another by said resilient means and separated when engagement between said parts is broken by inertia lag, link means connecting said member to said leading switch part for operating the latter and passing through dead center position at each movement in either direction of said member, whereby said leading part will be operated through a complete cycle of movement in opposite directions at each operation of said member in one direction, and circuit connections to each of said contacts, whereby when said circuit connections are included in series in said electric controlling circuit, said switch contacts will control the speed of said machine which operates them.

12. A governor for controlling the speed of a machine through the control of an electric circuit, which comprises a member driven by said machine, a link operated endwise in opposite directions by said member, a pair of elements mounted for movement in approximately parallel paths, a second link pivoted to one of said elements and to said first link and operating that element to which it is connected whenever said first link is given endwise movement, said second link having a toggle-like relation to said first link and the element to which it is connected, whereby whenever said first link moves in either endwise direction, said second link will move through dead center position and thus cause a to and fro movement of said member to which it is connected for each of said endwise movements of said first link, resilient means connecting said elements for causing the other of said elements to trail said first element to which the second link is connected when moving in one direction, and switch means for said control circuit operated by engagement of said elements under the action of said resilient means, whereby whenever said operating element moves in one direction at a speed above a selected speed, the inertia lag of said second element will overcome the stress of said resilient means and cause an operation of said switch means to decrease the speed of said machine.

13. In a speed governor, a pair of elements pivoted for oscillation independently of one another about the same axis, one of said elements being a leading element and having a slot therein, means connected to that leading element for oscillating it, the other of said elements being an inertia element and having a portion received in said slot and movable therein in the direction of oscillation to a substantial extent, a contact carried by said leading element, a second contact carried by said inertia element and engageable with the first contact when said inertia element moves in said slot in one direction, a spring connecting said elements and urging said inertia element in said slot in a direction to engage said contacts, circuit connections to said contacts throughout the oscillatory movements of said elements, whereby when said leading element is oscillated, said inertia element will move with it, with said contacts in engagement, until the speed of oscillation exceeds a predetermined speed, whereupon the inertia lag of said inertia element, while said elements are moving in said one direction, will overcome the action in said spring and cause a momentary separation of said contacts.

14. In a speed governor, a pair of elements pivoted for oscillation independently of one another about the same axis, one of said elements being a leading element and having a slot therein, means connected to that leading element for oscillating it, the other of said elements being an inertia element and having a portion received in said slot and movable therein in the direction of oscillation to a substantial extent, a contact carried by said leading element, a second contact carried by said inertia element and engageable with the first contact when said inertia element moves in said slot in one direction, a spring connecting said elements and urging said inertia element in said slot in a direction to engage said contacts, circuit connections to said contacts throughout the oscillatory movements of said elements, whereby when said leading element is oscillated, said inertia element will move with it, with said contacts in engagement, until the speed of oscillation exceeds a predetermined speed, whereupon the inertia lag of said inertia element, while said elements are moving in said one direction, will overcome the action in said spring and cause a momentary separation of said contacts, said inertia element having a weight adjustable thereon to different distances from said axis of oscillation, whereby the speed at which the lag causes the operation of said contacts, may be adjusted to some extent.

JEROME A. FRIED.